United States Patent [19]

Tompkins et al.

[11] Patent Number: 5,069,850
[45] Date of Patent: Dec. 3, 1991

[54] COEXTRUSION APPARATUS AND METHOD USING A RIGID DIE FOR VARYING THE OUTER PROFILE OF A TUBULAR EXTRUDATE

[75] Inventors: Dale A. Tompkins, Akron; Richard W. Sicka, Brecksville, both of Ohio

[73] Assignee: Bridgestone/Firestone, Inc., Akron, Ohio

[21] Appl. No.: 557,378

[22] Filed: Jul. 24, 1990

[51] Int. Cl.[5] .............................................. B29C 47/22
[52] U.S. Cl. ................................... 264/167; 264/173; 264/174; 264/209.2; 425/114; 425/133.1; 425/381; 425/462; 425/465; 425/466; 425/467
[58] Field of Search ............... 264/167, 173, 209.2, 264/174; 425/465, 466, 467, 381, 380, 133.1, 131.1, 462, 114

[56] References Cited

U.S. PATENT DOCUMENTS

| | | |
|---|---|---|
| 2,501,690 | 3/1950 | Prendergast .......................... 264/173 |
| 2,736,921 | 3/1956 | Mulbarger et al. ................ 425/462 |
| 3,134,832 | 5/1964 | Smith ..................................... 264/167 |
| 3,453,690 | 7/1969 | Mayner ................................ 425/381 |
| 3,840,311 | 10/1974 | Wight ................................... 425/133 |
| 3,940,221 | 2/1976 | Nissel ................................... 425/141 |
| 4,029,458 | 6/1977 | Kim et al. ............................ 425/135 |
| 4,038,017 | 7/1977 | Langecker .......................... 425/466 |
| 4,149,839 | 4/1979 | Iwawaki et al. .................. 425/133.1 |
| 4,161,379 | 7/1979 | Sudyk .................................. 425/133.1 |
| 4,249,875 | 2/1981 | Hart et al. ........................ 425/133.1 |
| 4,279,857 | 7/1981 | Feuerherm .......................... 264/541 |
| 4,359,354 | 11/1982 | Böhm ................................... 264/173 |
| 4,432,718 | 2/1984 | Wurzer ................................ 425/466 |
| 4,472,129 | 9/1984 | Siard .................................... 425/381 |
| 4,578,024 | 3/1986 | Sicka et al. ........................ 425/114 |
| 4,657,718 | 4/1987 | Sicka et al. ........................ 264/146 |
| 4,776,909 | 10/1988 | Bohm et al. ........................ 156/117 |
| 4,946,364 | 8/1990 | Wagner .............................. 425/133.1 |

FOREIGN PATENT DOCUMENTS 1370281 10/1974 United Kingdom ............... 425/132

Primary Examiner—Jeffery Thurlow
Attorney, Agent, or Firm—Ernst H. Ruf

[57] ABSTRACT

Coextrusion apparatus for varying the outer profile of a generally tubular extrudate formed by merging inner and outer streams of elastomeric material by varying the size of the annular outer extrusion die opening by an axially moveable die ring which varies the flow of the outer stream of elastomeric material which is deposited on the outer surface of the tubular extrudate. The die ring is formed on the end of a hydraulically moveable piston and is axially slideably moved along and is located concentrically about the tubular extrudate. A first annular tapered surface of the die ring moves along a similar tapered surface of a fixed conical-shaped die pin to vary the size of the outer extrusion orifice formed therebetween. A second surface, oppositely tapered to that of the first tapered surface of the die ring and formed integrally therewith as a one-piece member, communicates with the flow channel of the outer elastomeric material stream and continuously compensates for a change in pressure within the outer flow stream caused by varying the flow volume of the outer stream at a location generally adjacent the application of the outer stream on the outer surface of the tubular extrudate. A reinforcing guide directs a plurality of fiber-type reinforcing elements into the tubular extrudate generally at the merger of the inner and outer streams of elastomeric material. A method for varying the outer profile of the tubular extrudate is also presented.

20 Claims, 8 Drawing Sheets

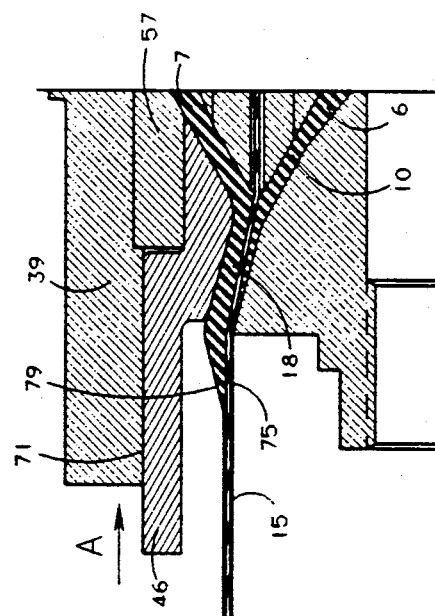
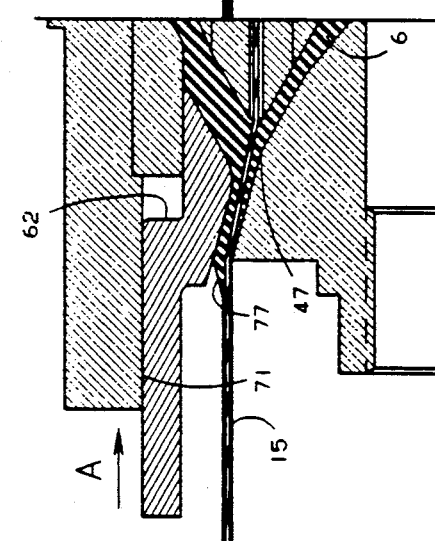
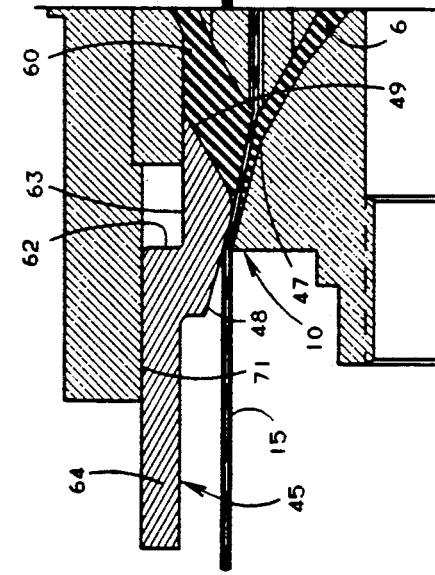
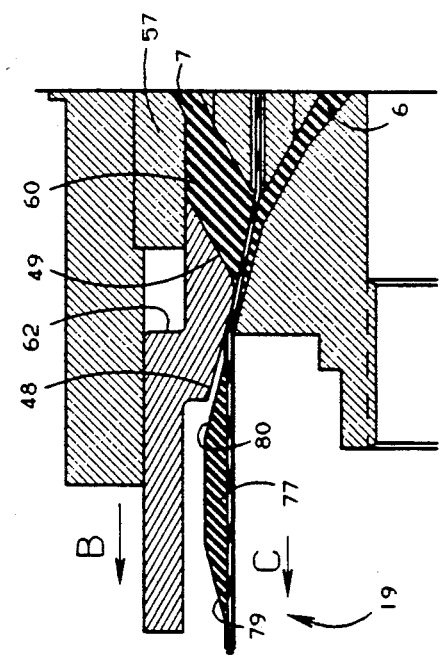
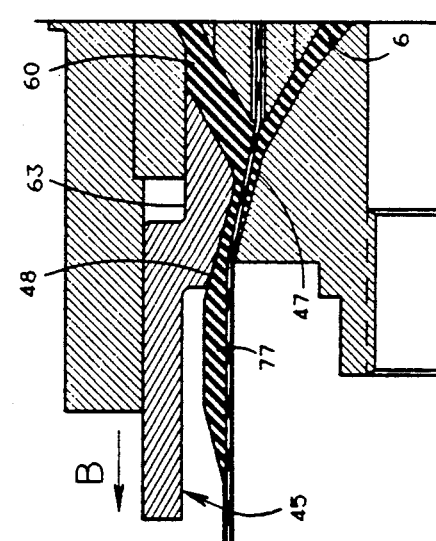
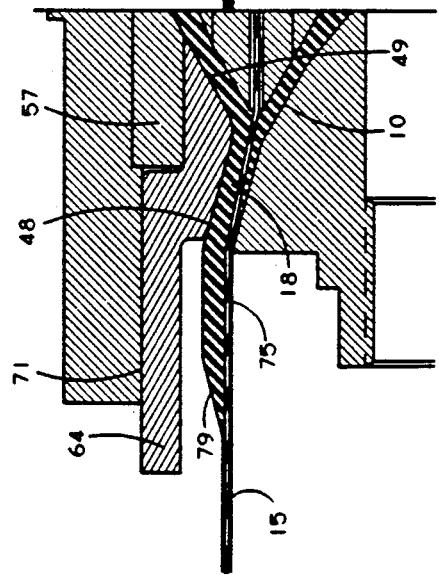

COEXTRUSION APPARATUS AND METHOD USING A RIGID DIE FOR VARYING THE OUTER PROFILE OF A TUBULAR EXTRUDATE

BACKGROUND OF THE INVENTION

1. Technical Field

The field of art to which this invention pertains is that of a coextrusion apparatus and method, particularly for use in manufacturing annular seamless components of elastomeric materials such as used in the production of pneumatic tires, specifically body plies for radial tires. More particularly the invention relates to such a coextrusion apparatus and method in which the outer profile of the tubular extrudate is varied by varying the amount of elastomeric material applied to the outer surface of the extrudate by an elastic die.

2. Background Information

Tubular components or articles such as pneumatic tire body plies, have previously generally been built by utilizing woven fabric and calendering the same with rubber stock which, when cut to size, entails wrapping the sheet component around a tire building drum and overlapping the ends of the sheet to produce an annulus with a generally axially parallel extending seam. In order to avoid this lapped or seamed construction, extrusion has been employed in the prior art whereby a tubular extrudate is produced containing reinforcement cords disposed therein.

Many of the problems with such lapped or seamed construction have been resolved by our previous invention of a coextrusion apparatus and method disclosed in U.S. Pat. Nos. 4,578,024 and 4,657,718, as well as a related product disclosed in U.S. Pat. No. 4,776,909, all of which are incorporated herein by reference in the interest of full disclosure. These earlier inventions provide a solution to the noted prior art problems by producing a generally tubular elastomeric ply or extrudate made up of first and second concentric tubular streams of elastomeric material having interposed adjacent their common interface, a closely and uniformly spaced array of parallel reinforcing elements.

In the building of a tire, the carcass or first stage body, consists of six elements namely, a body ply which is the reinforcing cord and skim, two sidewall bands or annuli, two body ply insert annuli and an inner liner. Heretofore assembly or placement of these six bands on a tire building drum required six separate manually performed steps wherein the individual strips were placed on the tire building drum. These various individual strips of rubber usually were formed of different elastomeric compositions in order to achieve different results when assembled into the final tire. The innerliner is formed of a highly air impervious material and is applied to the body ply to provide the barrier for retaining the air within a tubeless pneumatic tire. The particular compound of the inner liner provides such impermeability characteristics.

The present invention described below pertains particularly to the formation of the sidewall component or part thereof on the tubular body ply component of the vehicle tire, which also may contain the inner liner thereof when forming a first stage tire, wherein the body ply is extruded as a tubular extrudate and the innerliner, preferably of a permeable characteristic supplied by the inner flow channel is joined with the outer flow channel, the profile of which is varied to form the sidewall component or part thereof at distinct locations on the innerliner portion of the tubular extrudate.

The most pertinent prior art with respect to applying and varying the outer profile of a tubular extrudate are shown in the following U.S. patents.

U.S. Pat. No. 3,134,832, discloses a method for extruding articles which comprises an extrusion die having a body and a cylindrical exterior sleeve. A central circular hole is provided and an elastomeric constrictive annulus which defines the extrusion aperture is positioned directly behind a flange. The annulus is held against the interior surface of the flange by a ring. As a gear is turned a follower is screwed into the exterior sleeve, pressing against the ring and annulus so that the annulus can expand inwardly under the compressive force in order to uniformly reduce the size of the hole in the annulus, i.e., reduce the size of the extrusion aperture.

U.S. Pat. No. 3,840,311, discloses an extrusion nozzle for manufacturing a plurality of frozen food type articles. This patent discloses an extrusion chamber having an inlet supply and terminating in an outlet orifice. A flexible wall formed from neoprene rubber can be attached to the casing wall adjacent the outlet in a conventional fashion. Five air cylinders are mounted on a frame which serve to indent a flexible wall so as to vary the shape of the wall and alter the dimensions of the exit orifice U.S Pat. No. 3,940,221, discloses a die with a controllable lower lip opening. A metal die block is provided with a passageway for receiving flowable material which has a lower lip portion and an upper lip. The opening between the lips can be adjusted by moving an elongated metal rod having a head. The metal rod extends through a heater block, so that when the temperature is increased, the elongated rod increases in temperature and expands. A lower end of the heated rod will then be forcibly displaced in an axial direction, to press upon flexible lip and bend downwardly slightly to narrow the gap between the lips and decrease the thickness of the sheet which is being extruded.

U.S. Pat. No. 4,279,857, discloses a shaping nozzle having a core member surrounded by a two part sleeve to define an annular passageway which terminates in an exit passage around an outwardly and downwardly flared central pin or mandrel. An outer fixed ring surrounds an inner, elastic ring which has a substantially crescent shaped interior. A wedge engages an element and an outer ring, and movement of the wedge can determine the shape of the passageway at a given axial position. An axially displaceable piston defines the size of the passageway. An elastic ring having a cylindrical inner surface defines a part of flow passageway. Also, axial displacement of a piston causes movement of a frustoconical surface that defines a wall of the passageway and is capable of changing the thickness and shape of the passageway adjacent the nozzle.

U.S. Pat. No. 4,432,718, discloses an extrusion head comprising a die core and a casing ring located within a head housing. Each die ring section is axially adjustable by positioning screws so that the lower edge boundary of the die gap will be changed. In this fashion the extruded tube material will have walls of variable thickness at predetermined points and the thickness of the extruded tube will increase or decrease as a result of changes in the outer circumference of the tube while its interior contour remains the same.

It is also desirable that when varying the outer profile that the pressure within the stream of elastomeric material remain relatively constant throughout the varying of the size of the extrusion orifice to prevent the elastomeric material from "squirting out" onto the outer surface of the tubular extrudate upon the orifice forming die moving towards and away from the open and closed positions which results in an uneven transition area and smearing of the material along the tubular extrudate. It also is desirable that the die and components thereof be formed of rigid material to enable the extrusion apparatus to have a relatively long operational life eliminating constant repair and replacement of parts due to them being subjected to the high internal pressure and friction of the moving elastomeric streams.

Certain of the prior art patents discussed above disclose an extrusion head which include means of varying the flow of material through an extrusion orifice to regulate the profile of the extrusion material. However, none of these patents disclose the specific configuration and use of a rigid metal die element having two opposed tapered surfaces, one of which regulates the size of the outer extrusion orifice and the other automatically compensates for pressure changes in the stream of elastomeric material adjacent the extrusion orifice to provide a smooth, controlled variable outer profile of a tubular extrudate as in applicants' apparatus and method steps set forth below.

SUMMARY OF THE INVENTION

An objective of the invention is providing a solution to the noted prior art problem in terms of the apparatus and method by producing a generally tubular elastomeric extrudate in which the outer surface or profile thereof can be varied, especially for use in producing a first stage tire.

A further objective of the invention is to provide an extrusion apparatus and method in which the exterior profile of the extrudate, composite or body, can be applied substantially simultaneously with the formation of the tubular body; and in which variations in the outer profile can be abruptly initiated, profiled and terminated with no smearing or contamination of the outer surface of the tubular extrudate by automatically compensating for pressure changes in the elastomeric stream adjacent the extrusion orifice whereby further processing of the tubular composite can be accomplished without harmful effects from any contamination.

Still another objective of the invention is to provide such a coextrusion apparatus and method in which filament-type or cord reinforcing elements are introduced into the tubular extrudate, generally, simultaneously with the formation of the tubular extrudate and generally, simultaneously with the applying of the profiled exterior surface on the tubular extrudate.

A further objective of the invention is to provide such a coextrusion apparatus and method which will prepare a precise accurate, multi-component composite tubular member, intended primarily for formation of a pneumatic tire, having a profiled exterior surface, whereby the exterior surface can be profiled with different materials than that of the inner surface.

A still further objective of the invention is to provide such a coextrusion apparatus and method in which the outer profile preferably has ramped beginning and end configurations, providing a smooth merger with the outer surface of the tubular extrudate, and in which this smooth merger is accomplished by use of an integral one-piece metal die having a pair of oppositely tapered surfaces one of which regulates the annular size of an outer extrusion orifice through which the elastomeric material flows to form the tubular extrudate, and in which the other surface automatically regulates the size of an expansion chamber located adjacent the outer extrusion orifice to maintain the pressure within the elastomeric stream generally constant as it moves through the outer orifice.

Still a further objective of the invention is to provide such a coextrusion apparatus and method in which the varying of the outer profile is controlled principally by a metal die having a pair of opposed tapered surfaces which is formed on an end of a hydraulically movable piston which is slideably movable, axially and concentrically along and about the tubular extrudate, and in which the piston is moved by hydraulic pressure that can be accurately controlled by programmable equipment or the like.

A still further objective of the invention is to provide such a coextrusion apparatus and method which is of a relatively rugged and durable construction, which can be easily disassembled for repair and maintenance, which can be used with commercially available extruders for receiving the supply of extrudate material, and in which the type of reinforcing elements incorporated therein can vary depending upon the particular tire product desired.

A further objective of the invention is to provide such a coextrusion apparatus and method which will prepare a precise accurate multi-component composite tubular member intended primarily for formation of a pneumatic tire having an exterior surface that can be profiled with different materials from that of the inner surface and in which the profile can be accomplished without drool, weeping or smearing of the outer surface and without contamination of a thin coated outer surface of the tubular extrudate; and in which the varying profile has a ramped beginning and a ramped end configuration providing a smooth merger with the outer surface of the tubular extrudate.

These objectives and advantages are obtained by the coextrusion apparatus of the invention for varying the outer profile of a tubular extrudate, the general nature of which may be stated as including die means for forming inner and outer annular extrusion orifices for forming the tubular extrudate, said die means having an axially moveable outer die ring and an inner die member for adjustably forming the outer extrusion orifice therebetween; first means for forming an outer flow channel for delivering a first stream of elastomeric material to the outer extrusion orifice of the die means to form an outer layer of the tubular extrudate; second means for forming an inner flow channel for delivering a second stream of elastomeric material to the inner extrusion orifice of the die means to form an inner layer of the tubular extrudate; said outer die ring having first and second annular surfaces, said first surface being tapered to generally match a tapered surface on the inner die member and is spaced generally concentrically therefrom and forms the outer extrusion orifice therebetween, and with said second annular surface communicating with the outer flow channel; and third means for axially moving the outer die ring with respect to the inner die member to change the spacing therebetween to change the amount of elastomeric material passing through said outer orifice to vary the profile of said outer layer, with the axially movement of the second annular surface in coordination with that of the first annular surface changing the size of the outer flow channel in relationship to the changing size of the outer extrusion orifice to control the pressure within the first stream of elastomeric material moving through said outer orifice and forming the outer layer of the tubular extrudate.

These objectives and advantages are further obtained by the improved method of the invention, the general nature of which may be stated as a method for varying the outer profile of a generally tubular extrudate during the formation of said extrudate, including the steps of producing an outer independently controlled annular hollow stream of elastomeric material moving axially within an extrusion head; producing an inner stream of elastomeric material within said coextrusion head which merges with the outer stream to form the generally tubular extrudate; forming an annular extrusion orifice through which the outer stream of elastomeric material moves to form the tubular extrudate by an axially moveable rigid outer die ring; axially moving the outer die ring to vary the size of the extrusion orifice to vary the amount of elastomeric material moving through the extrusion orifice from the outer stream to vary the outer profile of the extrudate; and continuously compensating for a change in pressure within the outer stream of elastomeric material caused by varying the flow volume of said outer stream at a location generally adjacent the location of application of said outer stream on the outer surface of the tubular extrudate.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIGS. 7-12 are enlarged fragmentary diagrammatic sectional views showing the operational sequence of varying the outer material profile of the tubular extrudate.

Similar numerals refer to similar parts throughout the drawings.

DESCRIPTION OF THE PREFERRED EMBODIMENT

Figure 1:
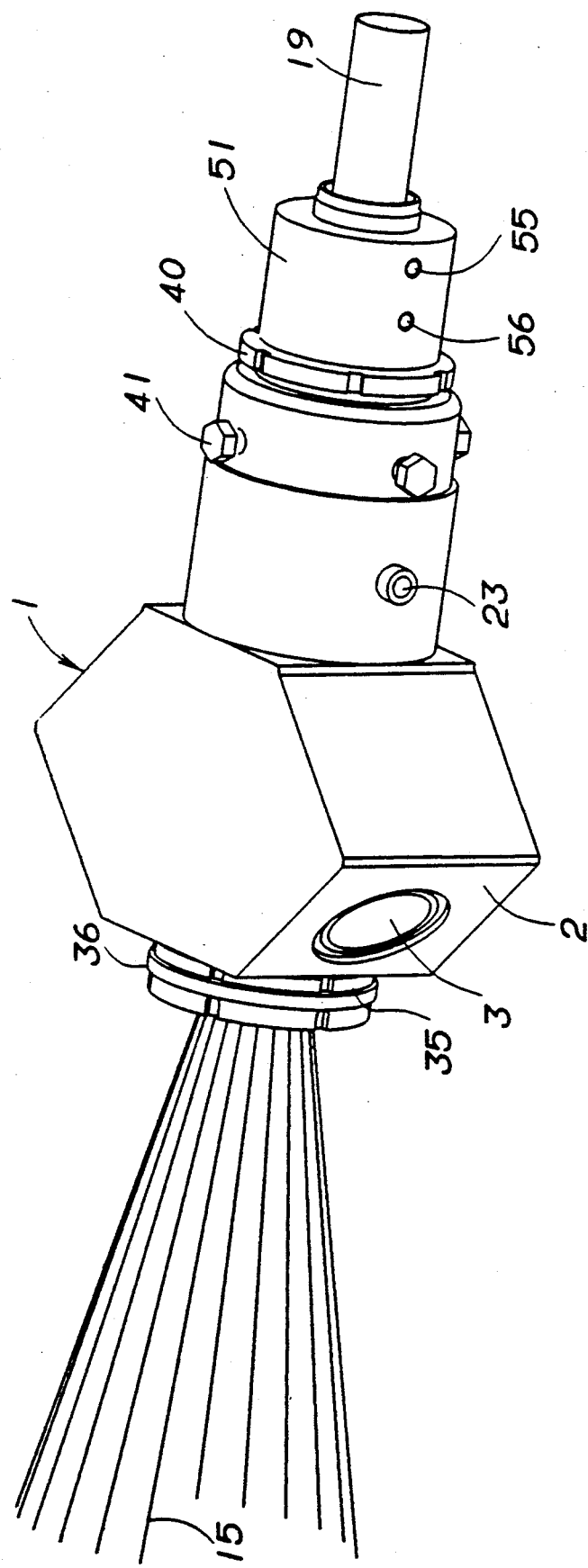
FIG. 1 is a perspective view of the coextrusion apparatus of the present invention.
Figure 2:
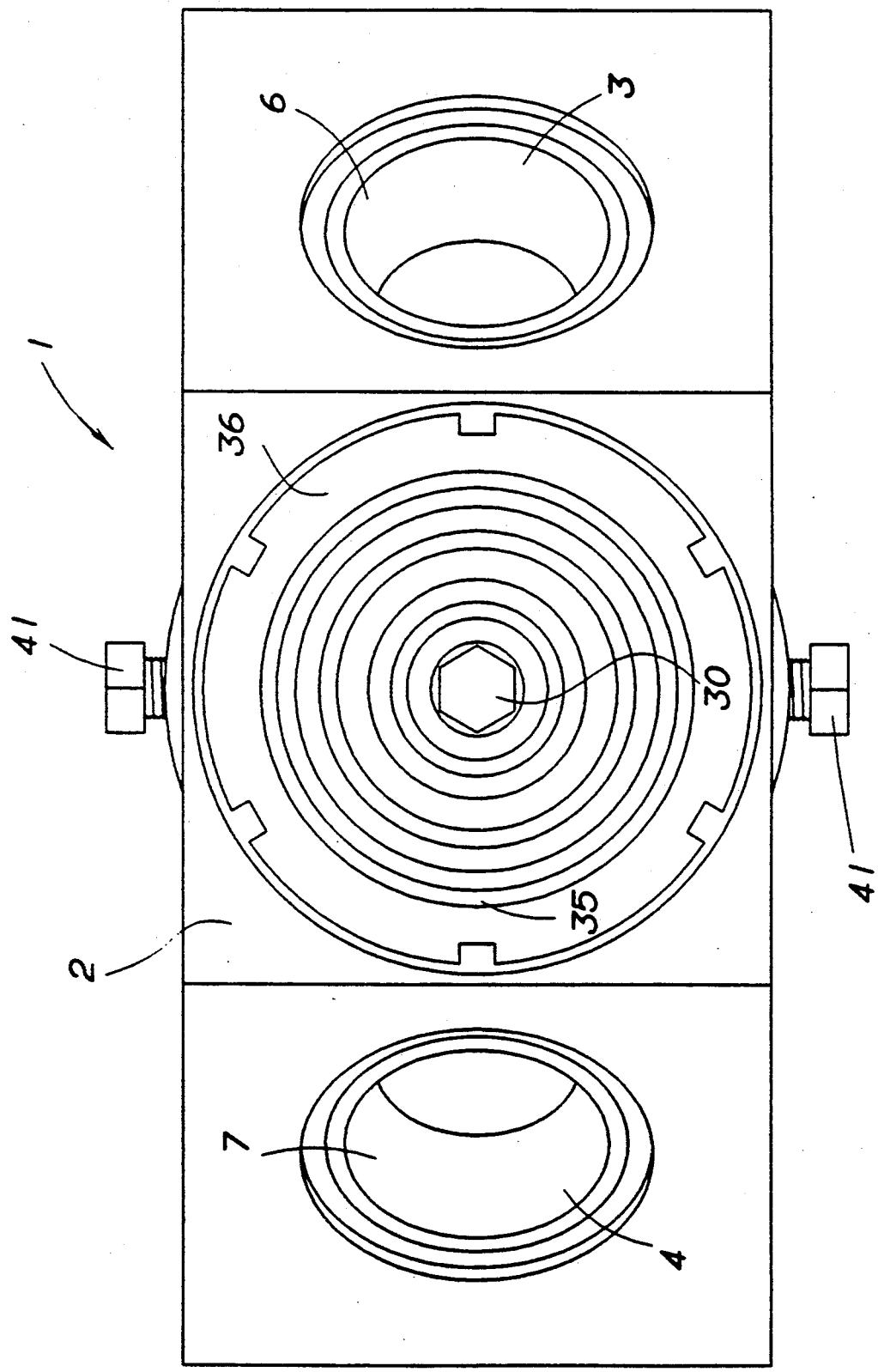
FIG. 2 is an enlarged elevational view of the entrance end of the coextrusion apparatus of FIG. 1.
Figure 3:
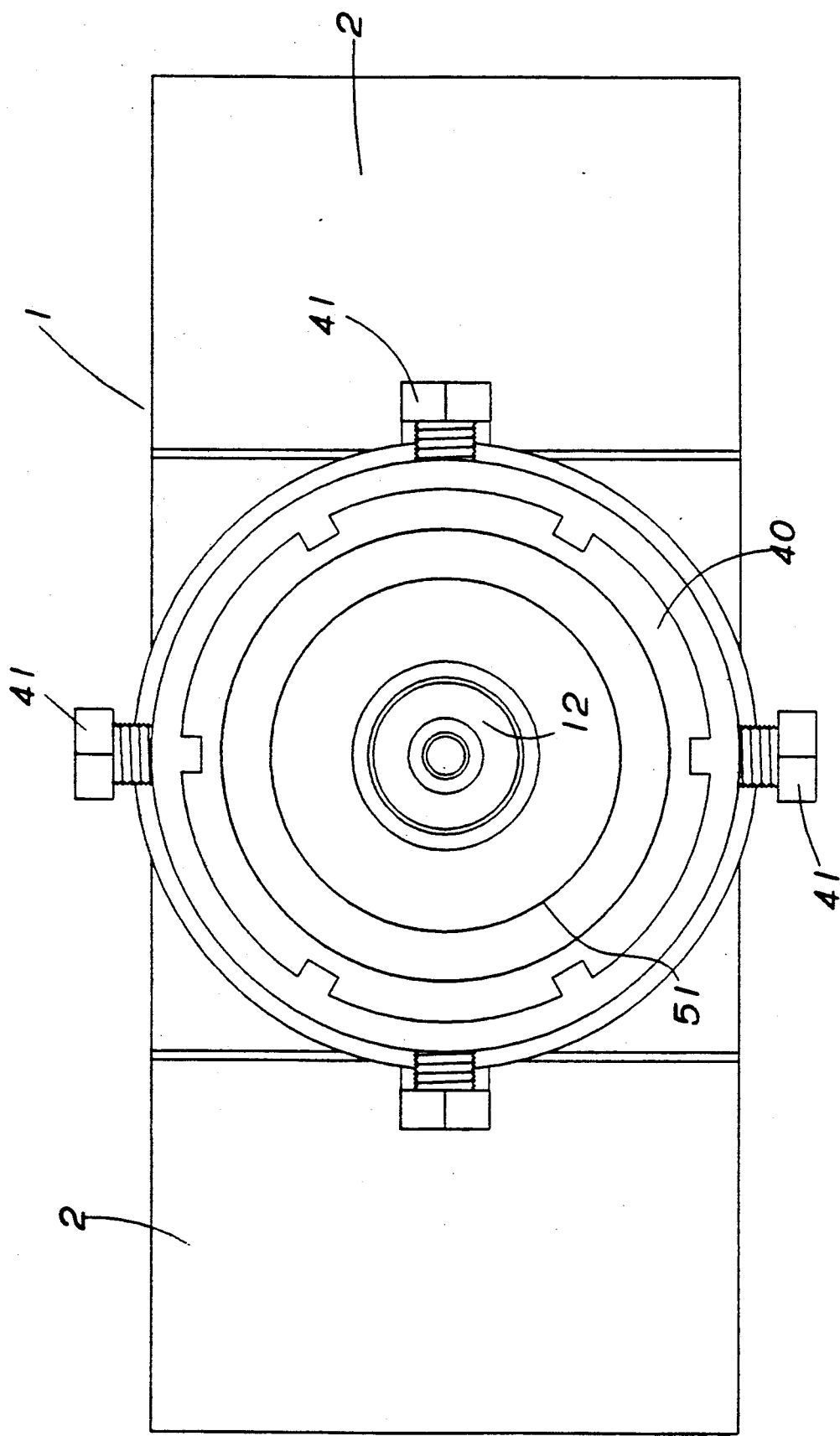
FIG. 3 is an enlarged elevational view of the exit end of the coextrusion apparatus of FIG. 1.
Figure 4:
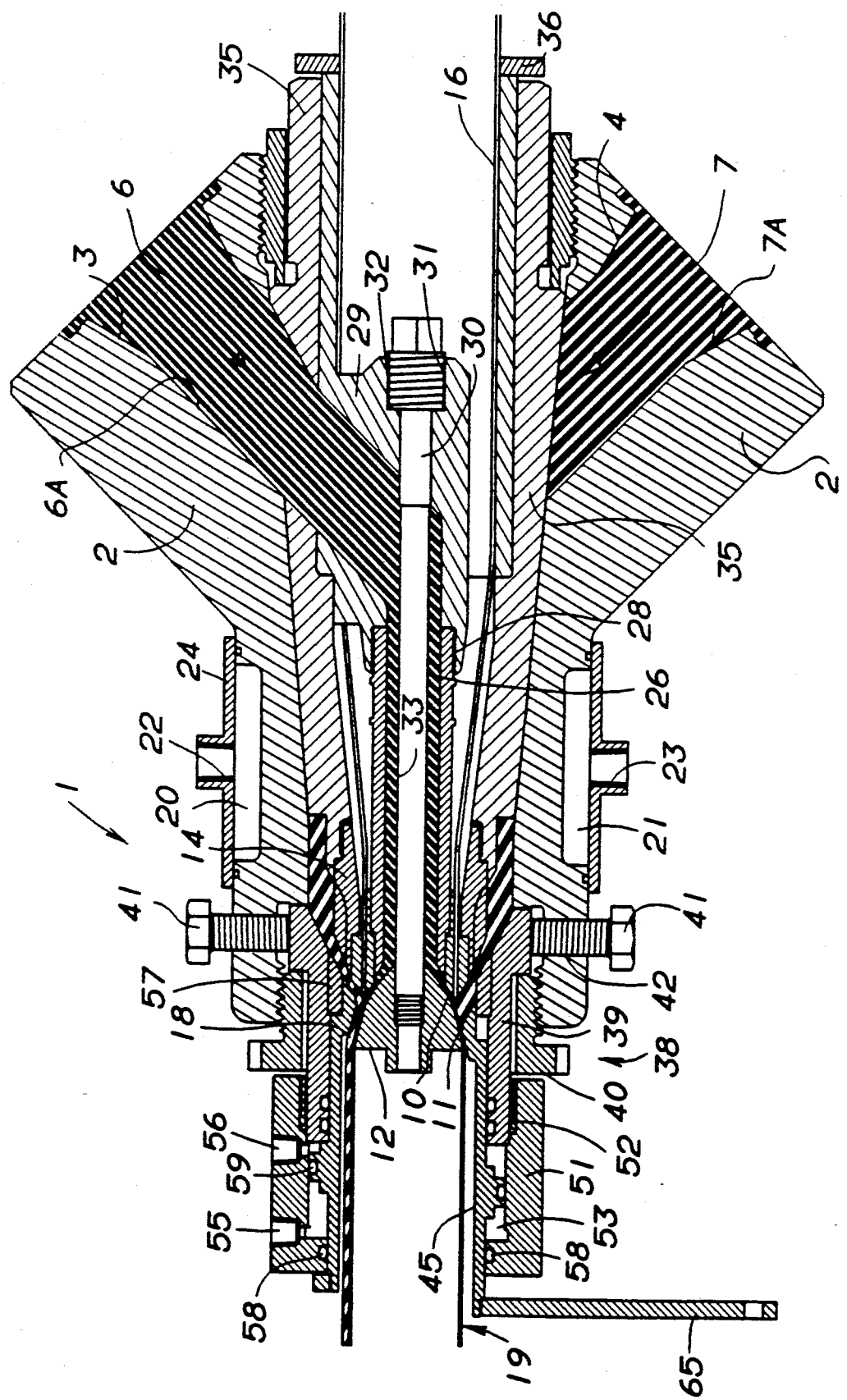
FIG. 4 is a vertical longitudinal sectional view of the extrusion apparatus of FIG. 1.

Referring specifically to FIGS. 1, 2 and 3, there is illustrated a perspective and end views of a coextrusion head, indicated generally at 1. Coextrusion head 1 includes an outer shell or housing 2 formed with a pair of inlet feed apertures 3 and 4 (FIG. 4), which are adapted to be threadably connected to delivery conduits (not shown) through which separate streams 6 and 7 of elastomeric stock flow from one or more extruders. The elastomeric material flows into individual separate material flow channels 6A and 7A which are formed within the extrusion head for subsequent delivery to the extrusion orifices as described below. The apparatus and means of delivery of the separate streams of elastomeric material within the coextrusion head are similar in many respects to that shown in our prior U.S. Pat. Nos. 4,578,024 and 4,657,718. Inlet aperture 3 communicates with inner flow channel 6A for directing and guiding inner flow stream 6 of an elastomeric material, while inlet aperture 4 communicates with flow channel 7A for directing and guiding outer flow stream 7 of an elastomeric material (FIG. 4).

Figure 5:
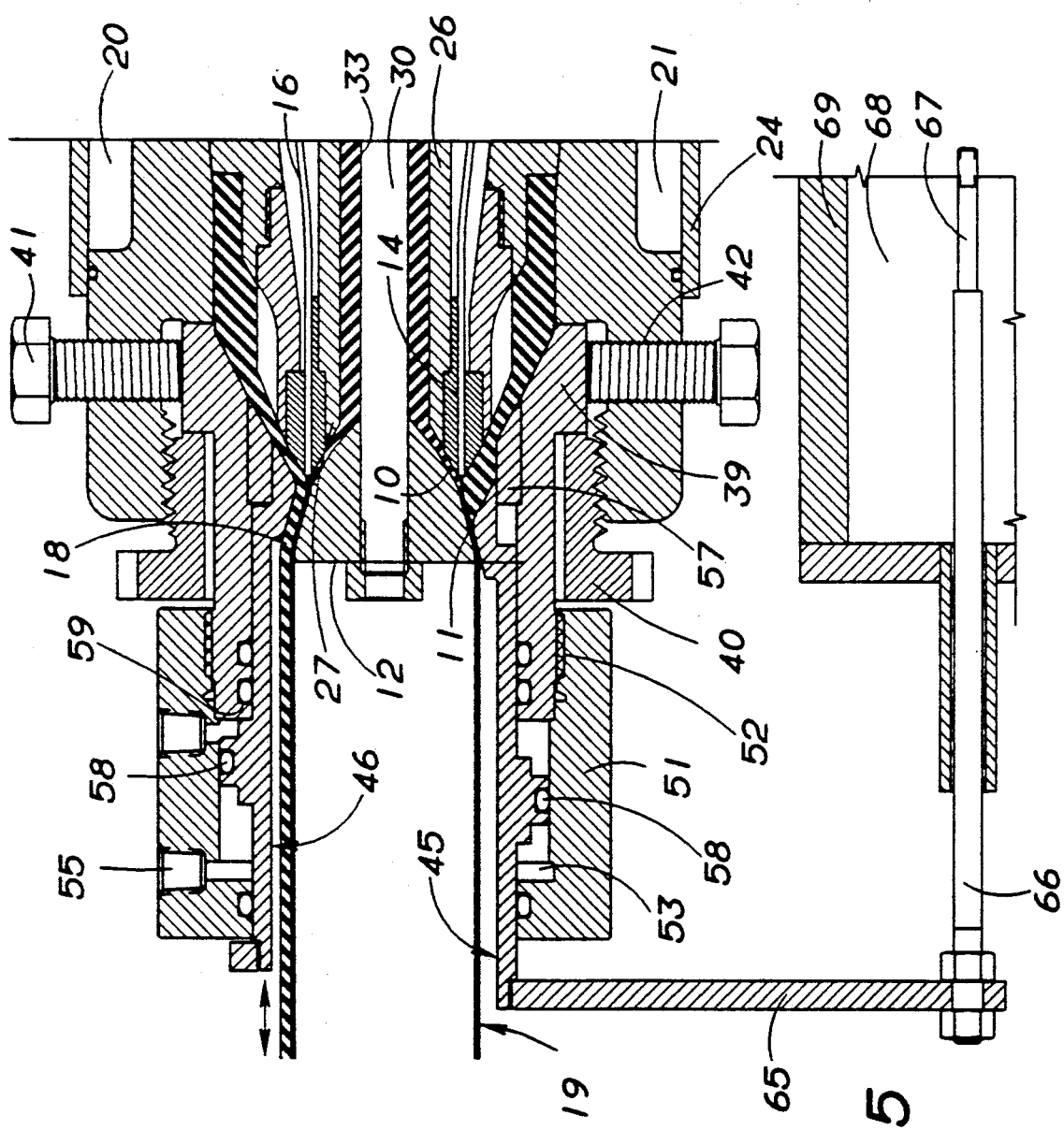
FIG. 5 is an enlarged fragmentary sectional view of the discharge end of the apparatus as shown in FIG. 4, with the elastic die ring shown in split open and closed positions.

Inner stream 6 flows through channel 6A which is formed within shell 2 in a manner similar to that shown in our two patents set forth above, for subsequent discharge through a generally fixed inner annular orifice 10 (FIGS. 4-6) formed between the outer annular conical surface 11 of a pin 12 and the annular conical surface 13 of a guide assembly 14. Guide assembly 14 is similar to the guide assembly of previously noted U.S. Pat. Nos. 4,578,024 and 4,657,718 and is used for independently directing and accurately positioning a circular array of uniformly spaced, individual reinforcing elements 15 which are located within and extend through individual guide tubes 16. Reinforcing elements 15 generally take the form of filaments, threads, yarns or cords and include natural or synthetic textiles, steel, wire, fiberglass, etc. and are encapsulated within inner and outer streams 6 and 7 of elastomeric material and merge therewith at the junction of the elastomeric streams at an adjustable outer orifice 18.

An outer extrusion orifice 18 is located slightly downstream of inner orifice 10 (FIG. 5) and the size thereof is controlled in accordance with the invention to vary the outer profile of a tubular extrudate 19 which is formed by extrusion head 1, as described in greater detail below.

Temperature fluid control channels 20 and 21 are formed in shell 2 to permit heating and cooling of the interior and, in particular, to maintain the die assemblies at the desired operating temperatures. These channels are connected to a source of heating and cooling fluid by conduits which extend into threaded apertures 22 and 23 of channel cover plates 24 (FIG. 4). Also, heat exchangers may be mounted top and bottom on the large horizontal surface of shell 2 (not shown) as is well known in the extrusion head art.

An annular tube 26 having a stepped forward end 27 which engages guide assembly 14, is fixably mounted within the central portion of extrusion head 1 by a rear threaded engagement 28 with an annular inner flow channel forming member 29 (FIG. 4). Pin 12 is fixably mounted within the forward or discharge end of extrusion head 1 by a solid rod 30 which extends coaxially through the hollow interior of tube 26 and has a threaded end 31 which is engaged within an interiorly threaded opening 32 formed in the rear of inner flow channel forming member 29. Pin rod 30 forms an annular space 33 within the interior of tube 26 and provides an annular flow channel portion of inner flow channel 6A. Inner flow channel forming member 29 is connected with an annular outer flow channel forming member 35 by a threaded nut 36 or other attachment means.

An outer die assembly indicated generally at 38 (FIGS. 4 and 5), includes an annular outer hold ring 39 which is secured in a clamped abutting position with an outer end of shell 2, by a clamping nut 40 and a plurality of adjusting bolts 41. Bolts 41 are threadably engaged within threaded holes 42 formed in the outer end of shell 2.

Figure 6:
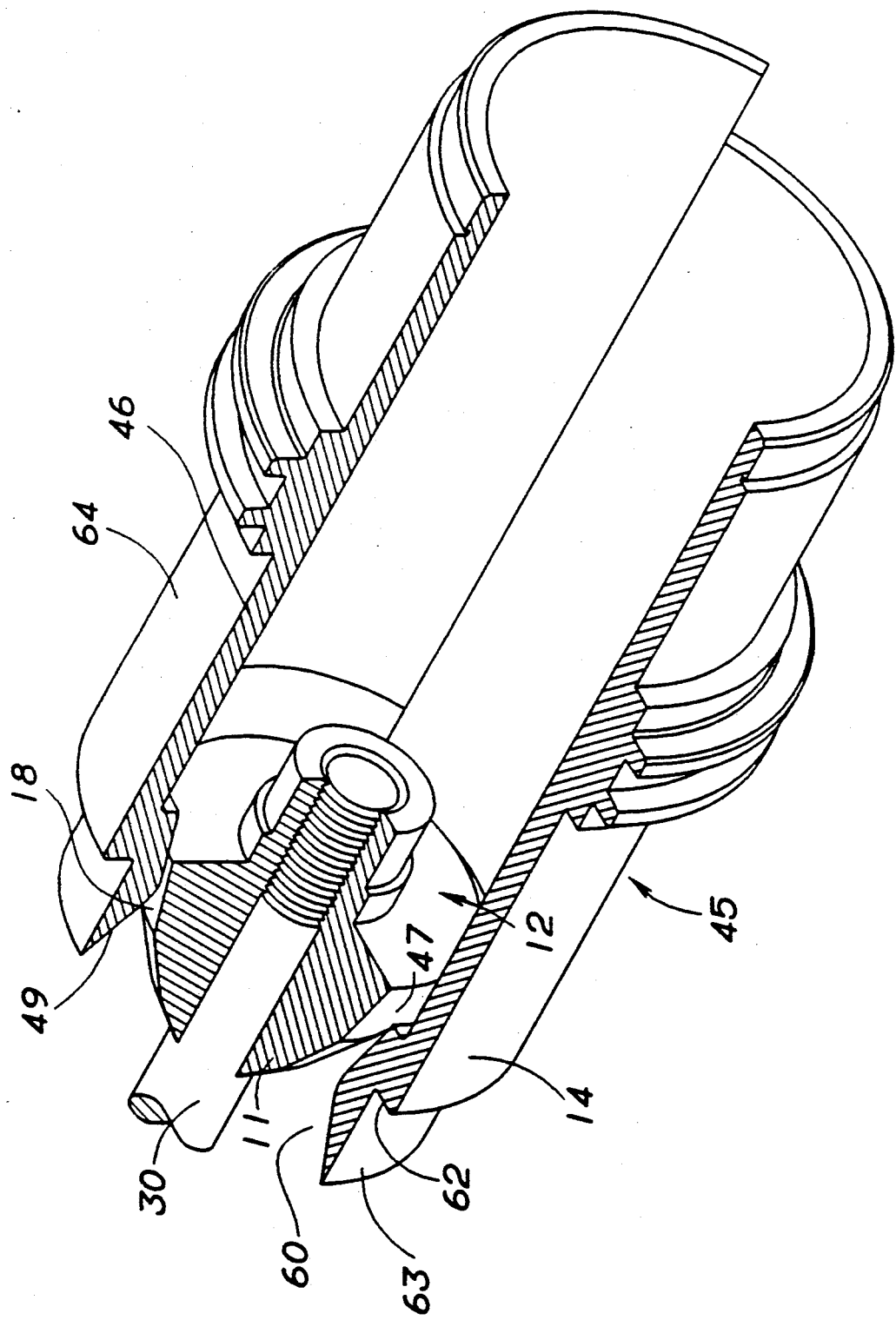
FIG. 6 is a greatly enlarged sectional view of the metal die ring and outer orifice forming pin, with the die ring shown in split open and closed positions.
Figure 13:
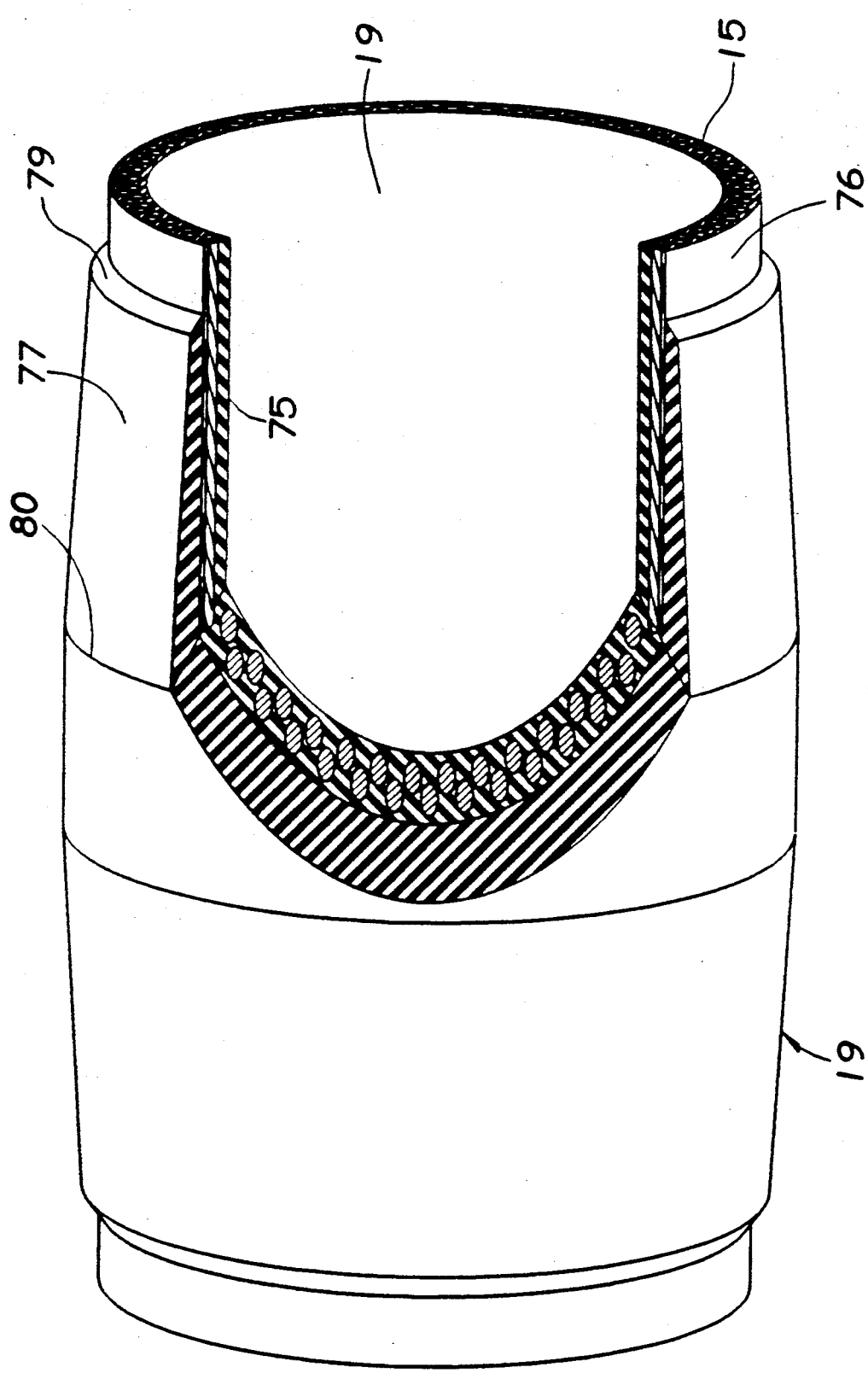
FIG. 13 is an enlarged perspective view of a tubular extrudate with parts broken away, showing the varied outer profile accomplished by the apparatus and method of the invention.

In accordance with the main feature of the invention, an annular die ring indicated generally at 45 (FIGS. 4-6), is mounted concentrically about pin 12 and the path followed by tubular extrudate 19, and forms the adjustable annular extrusion orifice 18 with the outer annular surface 47 of pin 12. Die ring 45 is best illustrated in FIG. 6, and includes a main cylindrical body 46 which forms a piston member for hydraulically moving the ring axially with respect to pin 12, and terminates in first and second oppositely tapered surfaces 48 and 49. Die ring 45 preferably is an integral one-piece member formed of metal with the taper of surfaces 48 and 49 being generally equal and with the radius of curvature of tapered surface 48 generally matching the taper of annular surface 47 of pin 12, which surface preferably is conical.

Die ring 45 is slideably mounted for axial movement within outer end of hold ring 39 and of an annular housing 51. Housing 51 is threadably attached at 52 to a forward end of hold ring 39 and forms an annular interior hydraulic fluid chamber 53 for effecting movement of die ring 45. A pair of hydraulic ports 55 and 56 are formed in housing 51 for emitting and discharging hydraulic fluid into and from chamber 53 for slideably moving die ring 45 into and out of engagement with an annular housing insert 57. A plurality of 0-rings 58 are mounted within complementary shaped annular grooves 59, between die ring body 46 and annular housing 51 and outer hold ring 39 to provide a generally fluid tight relationship for hydraulic chamber 53.

A plate 65 (FIG. 5) is mounted by a plurality of rods 66 to the front end of die ring 45 and is attached to the input shaft 67 of a linear encoder 68 or other motion detection device, which is mounted on a bracket 69 for detecting the amount of axial movement of die ring 45. This detection of axial movement of die ring 45 is supplied to a programmable controller or the like, which in turn controls the flow of hydraulic fluid into and from chamber 53 for regulating the size of outer extrusion orifice 18 formed between outer conical surface 47 of pin 12 and the interior surface of tapered conical wall 48, by the axial movement of the die ring as discussed in greater detail below.

The general construction of coextrusion head 1, including shell 2 and the flow channel forming members and reinforcing guide assembly, are well known in the art and form no particular part per se, of the present invention, but are components within which the improvements of this invention are incorporated to form the improved coextrusion apparatus and for carrying out the improved method steps of the invention, in order to vary the outer profile of tubular extrudate 19.

The operation of the improved coextrusion apparatus and method steps of the invention is best illustrated in FIGS. 5-12. Inner and outer streams of elastomeric composition 6 and 7, respectively, are fed into coextrusion head 1 from extrusion apparatus well known in the art, and move through their respective flow channels 6A and 7A, toward the respective inner and outer extrusion orifices 10 and 18, respectively.

Referring to FIG. 7, die ring 45 is shown at its most axially outward position wherein first tapered conical surface 48 is in its "closed position". In this closed position, a predetermined constant amount of elastomeric material is permitted to flow through inner orifice 10 and be deposited on reinforcing elements 15 to form an inner layer 75 of elastomeric material, and a constant predetermined amount of elastomeric material is permitted to flow through outer orifice 18 and be deposited on reinforcing elements 15 forming an outer layer 76 of elastomeric material thereon. Elastomeric layers 75 and 76 are extremely thin and provide a covering both internally and externally on reinforcing elements 15 to form tubular extrudate 19. As discussed previously, inner flow stream 6 of elastomeric material preferably is of a particular compound to form the inner liner of tubular extrudate 19 and preferably will be of a highly fluid impervious nature to provide the air retention barrier when used in forming a pneumatic tire. Outer elastomeric flow stream 7 usually is formed of a different elastomeric or rubber compound to form the body ply portion of the tubular extrudate. The particular thicknesses of inner and outer elastomeric layers 75 and 76 will vary depending upon the particular application for which tubular extrudate is intended for use.

In order to vary outer layer 76 of extrudate 19, a programmable controller of a type well known in the art, is actuated to supply hydraulic fluid into chamber 53 through port 55 causing die ring 45 to move axially inwardly in the direction of arrow A (FIGS. 8 and 9), which will increase the generally radial separation between tapered surface 48 and conical surface 47 of pin 12, thereby increasing the size of outer orifice 18. This movement permits a layer of elastomeric material indicated at 77, to be deposited on the outer layer 76, which will continue to be applied thereto until the desired thickness is achieved as shown in FIGS. 10 and 11.

When the desired axial length of outer profile forming layer 77 is achieved, the programmable controller will introduce hydraulic fluid into port 56 of chamber 53 forcing die ring 45 axially outwardly in the direction of arrow B (FIGS. 11 and 12), whereby tapered surface 48 thereof will move axially toward conical pin surface 47 reducing the size of extrusion orifice 18. This movement continues until reaching the closed position of FIG. 12, in which only the predetermined amount of outer elastomeric layer 76 is flowing through orifice 18 for depositing on reinforcing elements 15 to form tubular extrudate 19. Extrudate 19 will continue to move in the direction of arrow C (FIG. 12), with only the minimum inner and outer coatings being applied to reinforcing elements 15 until another outer profile variation is desired which again is achieved by actuation of cylindrical piston body 46 of die ring 45.

In further accordance with the invention, second tapered surface 49 of die ring 45 forms a variable expansion chamber 60 in outer flow channel 7A located immediately adjacent inner and outer extrusion orifices 10 and 18, respectively. As best shown in FIGS. 7-12, the movement of second tapered surface 49 in direct relationship with the inward and outward movement of die ring 45 varies the volumetric area at the entrance to extrusion orifice 18 to maintain or achieve the required or desired pressure within the elastomeric material of outer stream 7 adjacent outer extrusion orifice 18. This action of tapered surface 49 for varying the volume of expansion chamber 60 within the elastomeric stream, provides for a smooth even discharge flow rate of elastomeric material through outer orifice 18 and onto outer layer 76 of tubular extrudate 19. As shown in FIGS. 7-12, the movement of die ring 45 will provide for a beginning ramp 79 and an ending ramp 80 for elastomeric layer 77 to provide for a smooth transition with the outer elastomeric layer 76.

The compensation of the pressure/volume at the time of initiation of the further opening of outer orifice 18 and the subsequent flow of elastomeric material therethrough continuing through the termination of the outer flow upon closing of outer die ring 45, ensures a clean, smooth initiation cut-off of the outer layer flow material providing the pair of ramped end surfaces at the beginning and end of the outer layer 77. Without the formation of the expansion chamber and the simultaneous compensation for the change in pressure/volume which would occur within the elastomeric material adjacent the outer extrusion orifice due to the opening and closing thereof, the termination and beginning of outer layer 77 would be uneven. During the termination of the outer elastomeric stream upon closing of outer orifice 18 as shown in FIGS. 11 and 12, the terminating portion of the strip of material is placed in shear which provides for the smooth ramped termination at the axial end of layer 77.

A stepped shoulder 62 is formed adjacent a smooth axial sliding surface 63 above opposed slanted die ring surfaces 48 and 49. Shoulder 62 provides a stop which abuts housing insert 57 upon die ring 45 reaching its fully open position as shown in FIG. 9. This positive stop determines the maximum thickness of outer layer 77 and can be adjusted by varying the location of shoulder 62 or the axial length of housing insert 57 for predetermined extrusion operations in which the maximum thickness of layer 77 is known and is thereby accurately controlled. The outer cylindrical surface 64 provides a smooth sliding engagement with the cylindrical inner surface 71 of hold ring 39.

Although die ring 45 is described as having a "closed position", it is understood that in certain applications orifice 18 will still permit the flow of elastomeric material therethrough to form a thin outer layer 76. However, for other applications, die ring 45 could completely prevent any flow of elastomeric material through orifice 18 without affecting the concept of the invention. However, when used with reinforcing elements 15, it is desirable that a elastomeric flow continues through the inner and outer orifices for coating of the reinforcing elements with the thicknesses of these two coating layers varying depending upon the particular characteristics desired for the final tubular extrudate. Linear encoder 68 is operatively connected by appropriate control circuitry to a programmable controller well known in the art. Such controlled movement enables the accurate control of the outer die ring 45 for achieving the correct initiation and termination of outer elastomeric layer 77 in coordinated movement with the production of tubular extrudate 19. Other controllers will be provided for controlling the rate of hydraulic fluid entering and leaving fluid chamber 53 through ports 55 and 56 which physically moves die ring 45 axially for varying the size of extrusion orifice 18.

Furthermore, a computer or similar equipment preferably is utilized to control the flow rate and pressure of stream 7 as it leaves its external extruder and enters extrusion head 1, as well as controlling the tension of reinforcing elements 15. The flow rate or pressure of incoming stream 7 will determine the thickness of the elastomeric cover or coating on both sides of elements 15. Likewise, upon opening and closing of outer extrusion orifice 18, the flow rate of elastomeric stream 7 will be correspondingly increased by the computer control as the die opens and decreased as the die closes to provide a uniform flow rate and pressure of material through orifice 18. Also the thickness of outer layer 77 is determined in part by controlling the flow rate or pressure imparted on incoming stream 7 by computer control of the associated extruder.

Accordingly, the improved apparatus and method of the invention provides for the accurately controlled application of an outer layer of an elastomeric material onto the surface of a continuously produced tubular extrudate to provide a smooth, preferably ramped initiation and cutoff of the outer layer with the extrudate, by the spacing relationship between a first tapered surface of an axially movable die ring and a conical surface of a fixed die pin for adjusting the size of the outer extrusion orifice, and by compensating for the pressure changes at the entrance of the outer extrusion orifice by a second tapered surface on the die ring which moves simultaneously with the axial movement of the first tapered surface.

Accordingly the coextrusion apparatus and method is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved coextrusion apparatus and method is constructed and carried out, the characteristics of the construction and method, and the advantageous, new and useful results obtained the new and useful structures, devices, elements, arrangements, parts and combinations, and method steps are set forth in the appended claims.

We claim:

1. Coextrusion apparatus for varying the outer profile of a generally tubular extrudate, including die means for forming inner and outer annular extrusion orifices for forming the tubular extrudate, said die means having an axially moveable annular outer die ring and an inner die member for adjustably forming the outer extrusion orifice therebetween, said outer die ring having a central axis coinciding with a central axis of the tubular extrudate; first means for forming an outer flow channel for delivering a first stream of elastomeric material to the outer extrusion orifice of the die means to form an outer layer of the tubular extrudate; second means for forming an inner flow channel for delivering a second stream of elastomeric material to the inner extrusion orifice of the die means to form an inner layer of the tubular extrudate; said outer die ring having first and second annular surfaces, said first surface being conical and tapered to generally match a tapered conical surface on the inner die member and spaced generally concentrically therewith and forms the outer extrusion orifice therebetween, said first surface of the outer die ring and the tapered surface of the inner die member converging toward the central axis in an upstream direction with respect to the movement of the tubular extrudate with said second annular surface communicating with the outer flow channel and forming an expansion chamber within the other flow channel with the volume of said expansion chamber varying in direct relationship to the change in volume of the outer extrusion orifice upon movement of the die ring to maintain a generally constant pressure within the stream of elastomeric material passing through the outer extrusion orifice, and third means for axially moving the outer die ring with respect to the inner die member to change the spacing therebetween to change the amount of elastomeric material passing through said outer orifice to vary the profile of said outer layer with the axially movement of the second annular surface in coordination with that of the first annular surface changing the size of the outer flow channel in relationship to the changing size of the outer extrusion orifice to control the pressure the first stream of elastomeric material moving through outer orifice and forming the outer layer of the tube extrudate.

2. The coextrusion apparatus of claim 1 in which the conical first surface of the outer die ring converges toward the inner die member and terminates in the second annular surface, with said second annular surface being generally conical and diverging away from said inner die member.

3. The coextrusion apparatus defined in claim 1 in which motion detection means is operatively connected to the axially moveable outer die ring for detecting the amount of linear axial movement of said die ring for controlling the size of the outer extrusion surface.

4. The coextrusion apparatus defined in claim 1 in which the axially moveable outer die ring is a piston; and in which the third means is hydraulic pressure for slidably moving the first and second annular surfaces thereof with respect to the inner die member and outer flow channel.

5. The coextrusion apparatus defined in claim 1 in which the inner die member is a pin having a generally conical-shaped head which is located generally concentrically within the outer die ring to form the outer extrusion orifice therebetween.

6. The coextrusion apparatus defined in claim 5 in which the pin includes a shaft which supports the conical-shaped head thereof generally concentrically within the outer die ring; and in which the shaft is located within a hollow interior of a flow tube and defines therewith a portion of the inner flow channel for delivering the second stream of elastomeric material to the inner extrusion orifice to form the inner layer of the tubular extrudate.

7. The coextrusion apparatus defined in claim 6 in which a reinforcing guide element is mounted between the inner and outer flow channels for directing a plurality of individual reinforcing elements through the annular outer extrusion orifice for introduction into the merging streams of elastomeric material.

8. The coextrusion apparatus defined in claim 6 in which the inner extrusion orifice is located upstream of the variable annular outer orifice.

9. The coextrusion apparatus defined in claim 8 in which the size of the inner extrusion orifice is generally fixed during the formation of the tubular extrudate; and in which the outer extrusion orifice is movable between selected positions to vary the amount of elastomeric material on the outer surface of the tubular extrudate formed by the inner and outer extrusion orifices.

10. The coextrusion apparatus defined in claim 9 in which the first and second streams of elastomeric materials are of different rubber compositions.

11. The coextrusion apparatus defined in claim 10 in which the second stream of elastomeric materials is of a greater fluid imperviousness than that of the first stream of elastomeric material.

12. The coextrusion apparatus defined in claim 1 in which the first surface of the outer die ring and tapered surface of the inner die member extend generally parallel to each other when the outer extrusion orifice is in a substantially full open position.

13. The coextrusion apparatus defined in claim 1 in which the outer die ring is a one-piece metal member.

14. The coextrusion apparatus defined in claim 1 in which the angle of taper of the first and second annular surfaces of the outer die ring are generally equal to each other.

15. The coextrusion apparatus defined in claim 1 in which the first and second tapered surfaces are metal and are formed as an integral one-piece member.

16. A method for varying the outer profile of a generally tubular extrudate during the formation of said extrudate, including the step of:
 a) producing an outer independently controlled annular hollow stream of elastomeric material moving axially within an extrusion head;
 b) producing an inner stream of elastomeric material within said coextrusion head which merges with the outer stream to form the generally tubular extrudate;
 c) forming an annular outer extrusion orifice through which the outer stream of elastomeric material moves to form the tubular extrudate by providing an axially moveable rigid outer die ring having a pair of tapered surfaces, one of which forms a part of the outer extrusion orifice;
 d) axially moving the outer die ring to vary the size of the extrusion orifice by movement of said one of the tapered surface as the elastomeric material is moving through said extrusion orifice to vary the amount of elastomeric material moving through said orifice from the outer stream to vary the outer profile of the extrudate; and
 e) simultaneously compensating for a change in pressure within the outer stream of elastomeric material caused by varying the flow volume of said outer stream by the movement of the said one tapered surface at a location generally adjacent the location of application of said outer stream on the outer surface of the tubular extrudate, by the movement of said other tapered surface within said outer stream.

17. The method defined in claim 16 including introducing a plurality of filament-type reinforcing elements into the streams of elastomeric material.

18. The method defined in claim 16 including passing the inner stream of elastomeric material through a fixed annular orifice to form a portion of the tubular extrudate; and passing the outer stream of elastomeric material through the variable annular orifice downstream of the fixed annular orifice for merging with said inner stream to form the tubular extrudate.

19. The method defined in claim 18 including intermittently varying the thickness of the outer stream of elastomeric material being merged with the inner stream of material.

20. The method defined in claim 16 including continuously producing the outer stream of elastomeric material which joins with the inner stream of elastomeric material to form the tubular extrudate and intermittently varying the thickness of the outer stream by axial movement of the outer die ring to vary the outer profile of said tubular extrudate.

* * * * *